US008359611B2

(12) United States Patent
Johnson et al.

(10) Patent No.: US 8,359,611 B2
(45) Date of Patent: Jan. 22, 2013

(54) SEARCHABLE TELEVISION COMMERCIALS

(75) Inventors: David Phillip Johnson, Cary, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 11/075,247

(22) Filed: Mar. 8, 2005

(65) Prior Publication Data

US 2006/0218576 A1    Sep. 28, 2006

(51) Int. Cl.
*H04N 7/10* (2006.01)
(52) U.S. Cl. .......................................... 725/32; 370/432
(58) Field of Classification Search .................... 725/23, 725/34–36, 42, 46–47; 705/14; 370/420, 370/432, 486, 487
See application file for complete search history.

(56) References Cited

U.S. PATENT DOCUMENTS

| 4,750,053 | A | | 6/1988 | Allen | 358/335 |
|---|---|---|---|---|---|
| 5,699,125 | A | * | 12/1997 | Rzeszewski et al. | 725/50 |
| 5,838,314 | A | * | 11/1998 | Neel et al. | 725/8 |
| 6,057,872 | A | * | 5/2000 | Candelore | 725/23 |
| 6,571,216 | B1 | * | 5/2003 | Garg et al. | 705/14 |
| 6,606,644 | B1 | | 8/2003 | Ford et al. | 709/203 |
| 7,392,206 | B1 | * | 6/2008 | Frazier et al. | 705/26 |
| 2002/0032906 | A1 | * | 3/2002 | Grossman | 725/42 |
| 2002/0143655 | A1 | * | 10/2002 | Elston et al. | 705/26 |
| 2002/0152179 | A1 | * | 10/2002 | Racov | 705/67 |
| 2003/0149976 | A1 | * | 8/2003 | Shah-Nazaroff et al. | 725/34 |
| 2003/0172378 | A1 | * | 9/2003 | Lalitha et al. | 725/34 |
| 2003/0202773 | A1 | | 10/2003 | Dow et al. | 386/46 |
| 2003/0233278 | A1 | * | 12/2003 | Marshall | 705/14 |
| 2004/0019905 | A1 | * | 1/2004 | Fellenstein et al. | 725/32 |
| 2004/0073919 | A1 | | 4/2004 | Gutta et al. | 725/35 |
| 2004/0261100 | A1 | * | 12/2004 | Huber et al. | 725/32 |
| 2005/0278215 | A1 | * | 12/2005 | Seele, Jr. | 705/14 |
| 2006/0178986 | A1 | * | 8/2006 | Giordano et al. | 705/40 |

FOREIGN PATENT DOCUMENTS

JP          3-179895         8/1991

OTHER PUBLICATIONS

China Patent Office, Search Report, corresponding to Chinese Patent Application No. 2006100597643, dated Sep. 12, 2008.

* cited by examiner

*Primary Examiner* — Mark Rinehart
*Assistant Examiner* — Peter Cheng
(74) *Attorney, Agent, or Firm* — Esther Queen; Moore & Van Allen PLLC

(57) ABSTRACT

A mechanism is provided for indexing commercials. A viewer may query a search engine for a particular product or service. The index may include descriptors that are provided within a blanking interval within the media stream or within program guide information associated with the stream. The index information may also include Internet hyperlinks. Commercials may also have associated therewith a value that is relative to a value of media content. A viewer may accumulate value by viewing advertisements. Accumulated value may then be used to acquire more content.

16 Claims, 4 Drawing Sheets

SEARCHABLE TELEVISION COMMERCIALS

BACKGROUND OF THE INVENTION

1. Technical Field

The present invention relates to advertising in streaming media and, in particular, to television advertising. Still more particularly, the present invention provides a method, apparatus, and program for providing searchable television commercials.

2. Description of Related Art

Some forms of television and other forms of streaming media, such as radio, Internet radio, Internet video, and the like, include advertisements to subsidize the cost of the content and, more importantly, to make a profit. Most often, advertisements are embedded within the stream and are not useful outside the scope of the program. For example, when a viewer finishes watching a prime-time television program, the commercials are often lost and forgotten.

To take advantage of a captive audience for a short amount of time, advertisers tend to focus on brand recognition more than information. Furthermore, commercials tie in with the content only in limited cases. For example, a sporting event may have advertisements for athletic shoes or a travel related program may have advertisements for hotels or airlines. However, more often, a television is used to build a brand image rather than directly sell a product.

When a person is considering making a purchase, information from television commercials is not available. All that remains from television commercials and the like is a vague recollection of brands. Since the distribution model for television and other streaming media is broadcast or, at best, on-demand based on the overall content, the information available in advertisements is rarely available when needed.

BRIEF SUMMARY OF THE INVENTION

The present invention recognizes the disadvantages of the prior art and provides a mechanism for indexing commercials. A viewer may query a search engine for a particular product or service. The index may include descriptors that are provided within a blanking interval within the media stream or within program guide information associated with the stream. The index information may also include Internet hyperlinks. Commercials may also have associated therewith a value that is relative to a value of media content. A viewer may accumulate value by viewing advertisements. Accumulated value may then be used to acquire more content.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
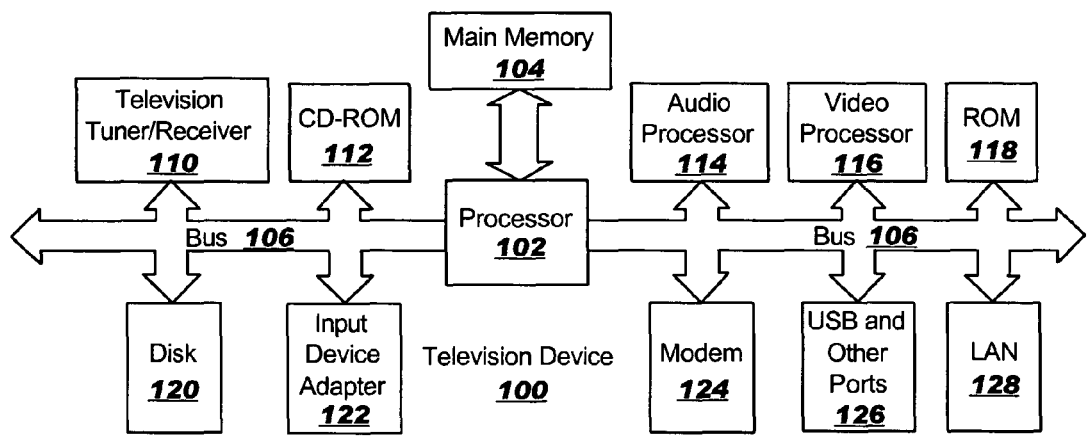
FIG. 1 is a block diagram of a data processing system, such as a television device, in which the present invention may be implemented.
Figure 2:
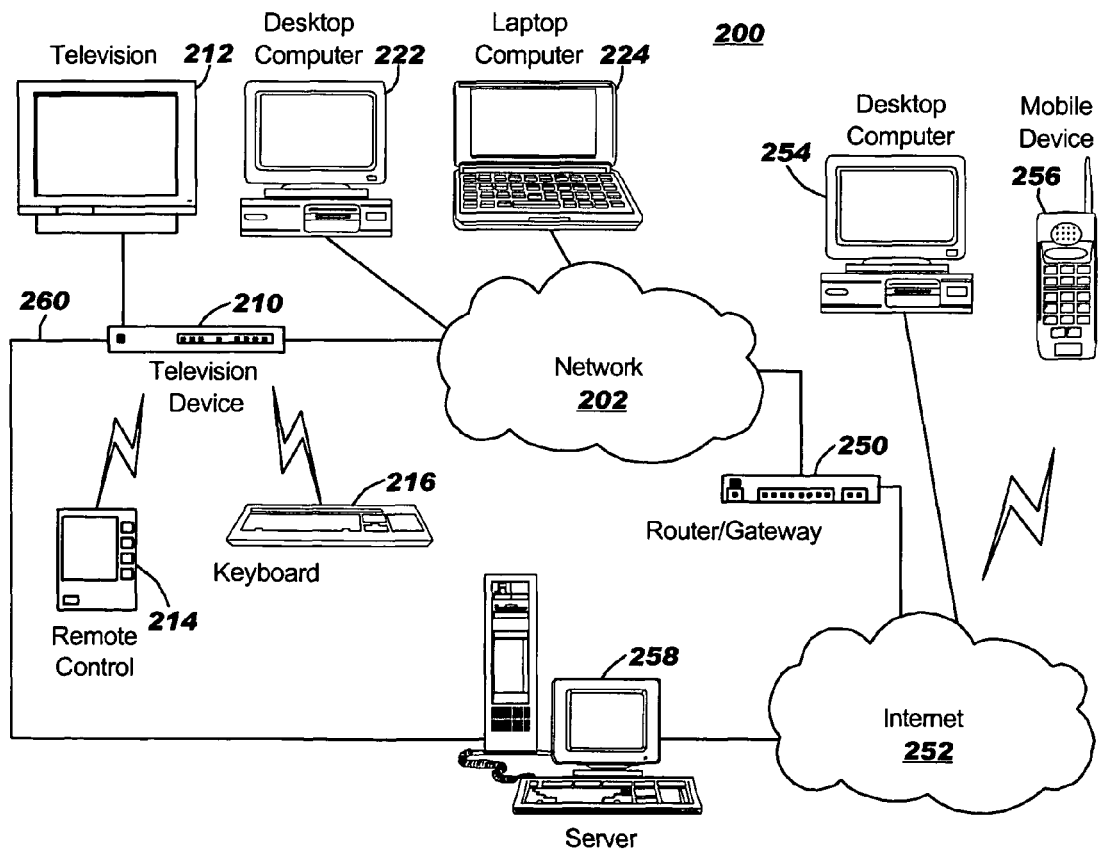
FIG. 2 depicts a pictorial representation of a network of data processing systems in which the present invention may be implemented.

The present invention provides a method, apparatus and computer program product for searchable commercials. The data processing device may be a single-processor computing device, a multiprocessing data processing system, or a virtual processor environment in which multiple processors and multiple layers of software may be utilized to perform various aspects of the present invention. Therefore, the following FIGS. 1 and 2 are provided as exemplary diagrams of data processing environments in which the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to FIG. 1, a block diagram of a data processing system is shown in which the present invention may be implemented. Television device 100 is an example of a television device, such as a digital video recorder (DVR), cable television receiver, satellite television receiver, or the like, in which code or instructions implementing the processes of the present invention may be located. In the depicted example, television device 100 employs a bus architecture through which processor 102 connects to other components of the device. Main memory 104 is connected to processor 102.

Television tuner/receiver 110 is connected to processor 102 through bus 106. Television tuner/receiver 110 may be, for example, a National Television System Committee (NTSC), Advanced Television Systems Committee (ATSC) over the air (OTA) tuner. Alternatively, television tuner/receiver 110 may be a digital cable or digital satellite receiver. In yet another embodiment, television tuner/receiver 110 may be a television input port that receives an audio/video signal from an external tuner/receiver. Other receivers may also be used in place of television tuner/receiver 110, such as a satellite radio receiver, for example.

Bus 106 also connects audio processor 114, video processor 116, read-only memory (ROM) 118, disk 120, and input device adapter 122 to processor 102. Audio processor 114 may provide audio processing, such as Dolby® Pro Logic® II or Dolby® Digital surround sound decoding. Video processor 116 may perform processing, such as MPEG2 or MPEG4 decoding. Disk 120 may be a hard disk drive (HDD) for storing media content streams. Input device adapter 122 may be, for example, an infrared (IR) remote control receiver, a keyboard/mouse adapter, or the like.

Television device 100 may also include optical disk reader 112, which may be, for example, a compact disk (CD) drive, digital video disk (DVD) drive, or the like. Modem 124 may be used to dial into a server to retrieve program guide information or the like. Universal Serial Bus (USB) and other ports 126 may be connected to processor 102 through bus 106. These ports may allow peripheral devices, such as printers, network adapters, etc., to be connected to television device 100. Local area network adapter 128 may allow television device 100 to share media content to other devices or to acquire program guide data.

An operating system runs on processor 102 and is used to coordinate and provide control of various components within data processing system 100 in FIG. 1. The operating system may be a commercially available operating system such as Linux™. "LINUX" is a trademark of Linus Torvalds. Instructions for the operating system and applications or programs are located on storage devices, such as hard disk drive 120 or ROM 118, and may be loaded into main memory 104 for execution by processor 102. The processes of the present invention may be performed by processor 102 using computer implemented instructions, which may be located in a memory such as, for example, main memory 104.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. The depicted example in FIG. 1 and above-described examples are not meant to imply architectural limitations. For example, television device 100 also may be a desktop computer, laptop computer, or telephone device in addition to taking the form of a television device.

Television device 100 may store media streams, including advertising, on disk 120. In accordance with a preferred embodiment of the present invention, television device 100 indexes commercials so viewers can find information when desired. A viewer may query a search engine for a particular product or service. The index may include descriptors that are provided within a blanking interval within the media stream or within program guide information associated with the stream. The index information may also include Internet hyperlinks. Commercials may also have associated therewith a value that is relative to a value of media content. A viewer may accumulate value by viewing advertisements. Accumulated value may then be used to acquire more content.

FIG. 2 depicts a pictorial representation of a network of data processing systems in which the present invention may be implemented. Network data processing system 200 is a network of computers in which the present invention may be implemented. Network data processing system 200 contains a network 202, which is the medium used to provide communications links between various devices and computers connected together within network data processing system 200. Network 202 may include connections, such as wire, wireless communication links, or fiber optic cables.

In the depicted example, television device 210 is connected to network 202 and is connected to television 212. In addition, desktop computer 222 and laptop computer 224 are connected to network 202. A viewer may access features of television device 210 using remote control 214, keyboard 216, desktop computer 222 through network 202, or laptop computer 224 through network 202. For example, a viewer may enter a query for commercials and view matching commercials on television 212. A query may include keywords, for example. Television device 210 may store media streams, including commercials.

The commercials may be indexed using descriptors found in blanking intervals or program guide data. When television device 200 receives a query, search results may be presented on television 212, desktop computer 222, or laptop computer 224. When a viewer selects a particular commercial matching the query, the portion of the media stream containing the commercial may be played back through television 212 or may be streamed to desktop computer 222 or laptop computer 224.

Devices connected to network 202 may access the Internet 252 through router/gateway 250. Internet 252 representing a worldwide collection of networks and gateways that use the Transmission Control Protocol/Internet Protocol (TCP/IP) suite of protocols to communicate with one another. Other networking protocols may also be used. At the heart of the Internet is a backbone of high-speed data communication lines between major nodes or host computers, consisting of thousands of commercial, government, educational and other computer systems that route data and messages. Alternatively, television device 210 may connect directly to the Internet through a cable or digital subscriber line (DSL) modem, for example, without network 202.

A user may access the services of television device 210 using desktop 254 or mobile device 256, for example, through Internet 252. Television device 210 may include a Web server, for example. Alternatively, the services of television device 210 may be made available through server 258. More particularly, a user of desktop computer 254 or mobile device 256 may query for commercials stored on television device 210. In one exemplary embodiment, commercials may also be stored on server 258 for on-demand viewing. Server 258 may include a Web server and search engine to allow access to indexed commercials.

Network data processing system 200 may include additional servers, clients, and other devices not shown. In the depicted example, network data processing system 200 is embodied within the Internet. Of course, network data processing system 200 also may be implemented as a number of different types of networks, such as for example, an intranet, a local area network (LAN), or a wide area network (WAN). FIG. 2 is intended as an example, and not as an architectural limitation for the present invention.

Figure 3A:
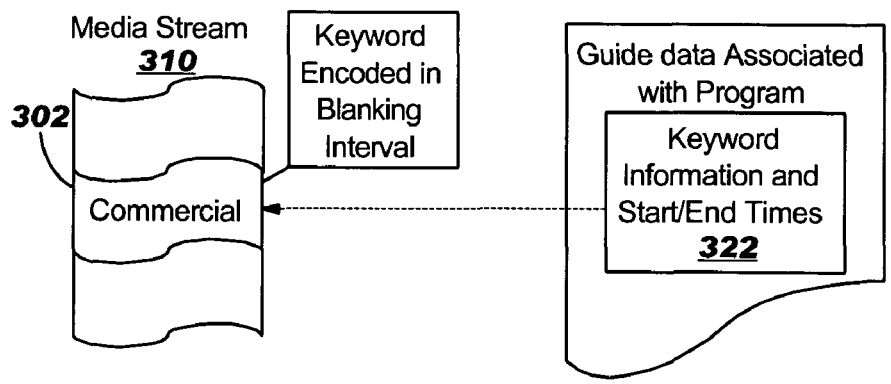
FIGS. 3A and 3B depict streaming media with indexed commercial information in accordance with exemplary embodiments of the present invention.
Figure 3B:
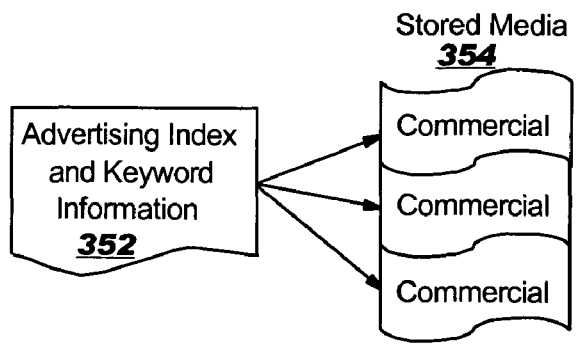

FIGS. 3A and 3B depict streaming media with indexed commercial information in accordance with exemplary embodiments of the present invention. More particularly, with reference to FIG. 3A, media stream 310 may be, for example, a television program, such as a movie, an episode of a series, a sporting event, or the like. Alternatively, media stream 310 may be a radio commercial or other media stream. Media stream 310 includes commercial 302. In the case of a television program, such as standard analog television, media stream 310 may include keyword descriptors or the like encoded in the blanking interval between the program content and the commercial.

Alternatively, media stream 310 may have associated therewith guide data 320. Many digital media sources, such as digital cable or satellite, include guide data. Other sources of guide data currently exist, such as TitanTV® and Zap2It®, for example. "TITANTV" is a registered trademark of Decisionmark Corporation. "ZAP2IT" is a registered trademark of Tribune Media Services. In accordance with an exemplary embodiment of the present invention, guide data 320 is modified to include keyword information and start/end times 322.

Current television services, such as digital cable and satellite, allow viewers to search program listings by keywords, actor, director, etc. In accordance with an exemplary embodiment of the present invention, a viewer may search guide data 320 for commercials that are already stored or otherwise available for viewing. The start/end times may then be used to present selected commercials.

As shown in FIG. 3B, advertising information may be extracted and compiled into index 352. A viewer may search index 352 that references commercials in stored media 354. Results of the search may be presented to the viewer. Responsive to selection of a particular advertisement or commercial, the television device presents the commercial to the viewer.

Figure 4:
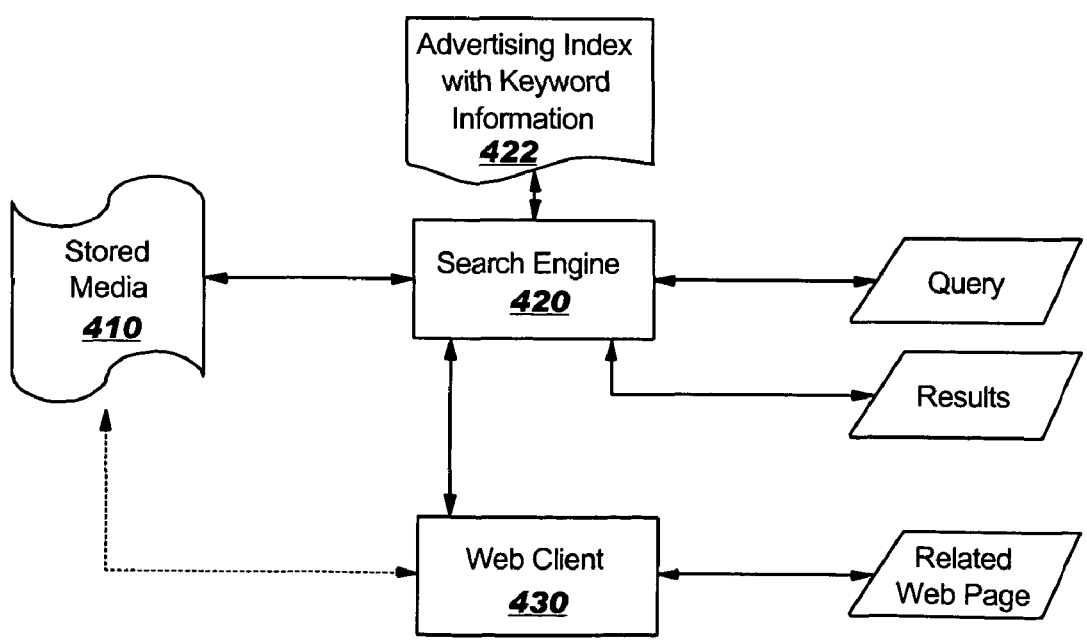
FIG. 4 is a block diagram illustrating the functional components of a searchable commercial system in accordance with an exemplary embodiment of the present invention.

FIG. 4 is a block diagram illustrating the functional components of a searchable commercial system in accordance with an exemplary embodiment of the present invention. The searchable commercial system includes stored media 410. Search engine 420 receives a query and provides results based on advertising index with keyword information 422. A viewer may use search engine 420 through Web client 430. Results may be presented in Web client 430 as a results Web page.

Figure 5:
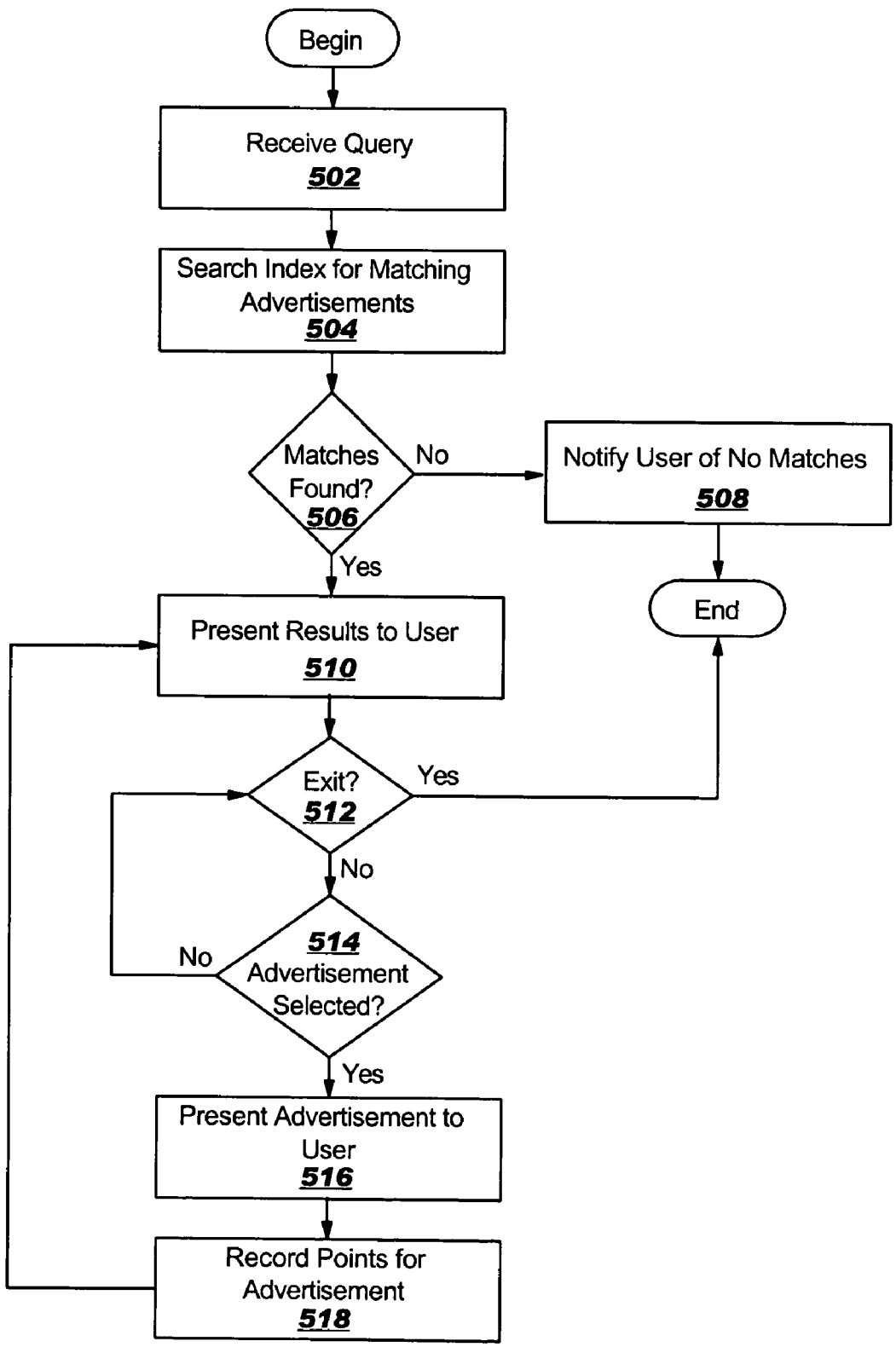
FIG. 5 is a flowchart illustrating the operation of a searchable commercial system in accordance with an exemplary embodiment of the present invention.

FIG. 5 is a flowchart illustrating the operation of a searchable commercial system in accordance with an exemplary embodiment of the present invention. The operation shown in FIG. 5 may be initiated when a user wishes to search for commercials. For example, a user may be shopping for a dishwasher or other type of product. Thus, the user may enter a query, such as a text string including keywords and Boolean operators, for example. In the above example, a query may include the text "dishwasher" or "dishwasher and quick dry."

Operation begins and the system receives a query (block 502). The system searches the index for matching advertisements (block 504). A determination is made as to whether matches are found (block 506). If no matches are found, the system notifies the user of no matches (block 508) and operation ends.

If matches are found in block 506, the system presents results to the user (block 510). A determination is made as to whether an exit condition exists (block 512). An exit condition may exist, for example, when the user shuts down the system or when the user exits the commercial search feature. If an exit condition exists, operation ends.

If an exit condition exists in block 512, a determination is made as to whether an advertisement is selected from the results (block 514). If an advertisement is not selected, operation returns to block 512 to determine whether an exit condition exists. If an advertisement is selected in block 514, the system presents the advertisement to the user (block 516). After the advertisement is viewed, the system may then record points earned for viewing the advertisement (block 518). Thereafter, operation returns to block 510 to present results to the user.

A business model may be used to assign point values to commercials or advertisements. These points may be accumulated by viewing commercials. Earned points may then be used in exchange for content. For example, in an "always positive" model, a customer may view content only when the customer's account has a positive number of points. The television device or, alternatively, a centralized server may track the time that content is viewed and the points accumulated for viewing commercials. If the account reaches zero, the customer may watch commercials to earn more points. Points may be assigned differentially. For example, prime time programs may "cost" more than non-peak time programs. Alternatively, a customer may start with a certain number of points and points may be subtracted for viewing content, but replenished if the viewer does not watch content. For example, a customer may get fifteen free minutes every four hours.

In an alternative embodiment, the viewer may exchange points for premium content, such as pay-per-view movies or events. In yet another embodiment, customers may exchange points for other goods or services, such as upgraded equipment, products offered through shopping networks, frequent flyer miles, or the like. The number of possible models is numerous.

Furthermore, various members of the household may be assigned different point values, provided some identification mechanism exists. Such mechanisms are well-known in the art. For example, a given viewer may provide a username and/or password when accessing the television device. Alternatively, multiple television devices or receivers may exist within the household, each with an identification mechanism, such as an integrated circuit (IC) card or the like. A main user, such as the head of the household, may assign points to various members of the household.

Returning to FIG. 2, television device 210 may communicate with server 258 through dial-up connection 260 or through Internet 252. Television device 210 may send viewing data, such as content that is watched and points earned for watching commercials, to server 258. Server 258 may then use this data to adjust billing information. In an alternative embodiment, television device 210 may manage and control viewing locally. In either embodiment, television device 210 or server 258 may provide a graphical user interface (GUI) for a customer to manage an account. Through the GUI, the customer may assign points to household members, exchange points for content, products, or services, or view a bill with detailed viewing data. The GUI may be a user interface provided by the television device 210 or a Web-based interface, for example.

Figure 6:
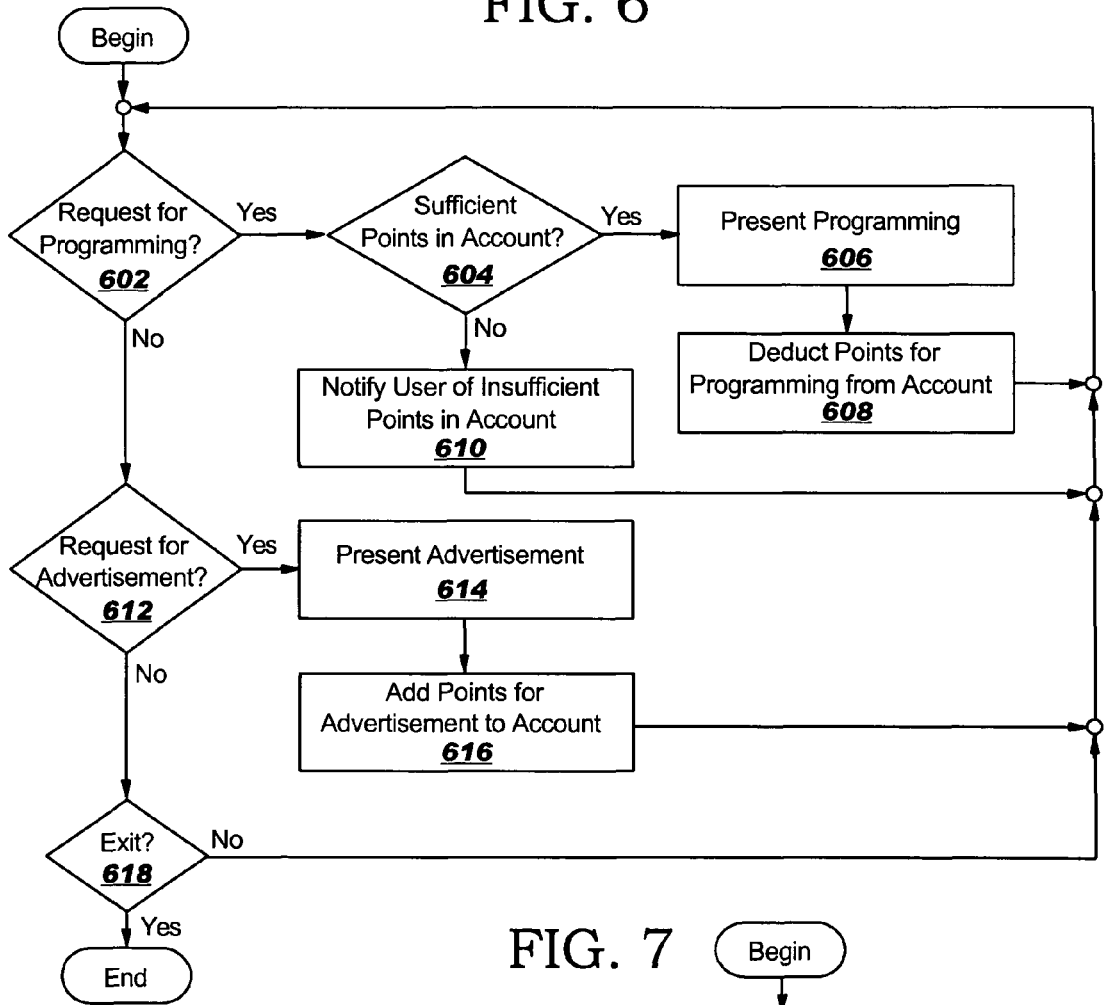
FIG. 6 is a flowchart illustrating management of customer access in a television system with commercial value business model in accordance with an exemplary embodiment of the present invention.

FIG. 6 is a flowchart illustrating management of customer access in a television system with commercial value business model in accordance with an exemplary embodiment of the present invention. The television system may be embodied, for example, within television device 210 or server 258 of FIG. 2. Operation begins, for example, when the television device is powered on or when a user accesses an account at the server. Next, a determination is made as to whether a request for programming is received (block 602). The request may be received at the television device when a viewer attempts to watch a particular program. Alternatively, the request may be received at the television service when a pay-per-view event is requested.

If a request for programming is received, a determination is made as to whether the account has sufficient points for viewing the programming (block 604). If sufficient points exist, then the system allows the programming to be presented (block 606). Then, the system deducts points for the programming from the account (block 608) and operation returns to block 602 to determine whether a request for programming is received. If the account does not have sufficient points for the requested programming in block 604, the system notifies the user of insufficient points in the account (block 610) and operation returns to block 602 to determine whether a request for programming is received.

Returning to block 602, if a request for programming is not received, a determination is made as to whether a request for advertisement is received (block 612). If a request for an advertisement is received, the system allows the advertisement to be presented (block 614). Then, the system adds points for the advertisement to the account (block 616) and operation returns to block 602 to determine whether a request for programming is received.

If a request for an advertisement is not received in block 612, then a determination is made as to whether an exit condition exists. An exit condition may exist, for example, when the television device is powered down or when the customer is finished accessing the account at the server. If an exit condition exists, operation ends; otherwise, operation returns to block 602 to determine whether a request for programming is received.

The operation of FIG. 6 is for managing access to programming content at the television device or a server in an "always positive" business model. However, as discussed above, other models may also exist and the operation may be modified accordingly. For example, the business model may allow a customer to "go negative," meaning the customer may have a negative number of points. In this instance, the customer may pay for the negative points when the next billing cycle closes or the customer may erase a negative balance by viewing more advertisements or commercials.

Figure 7:
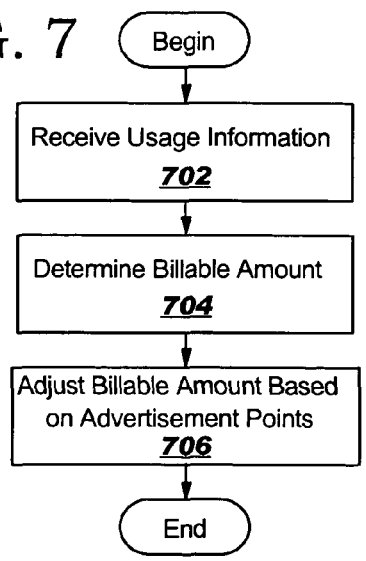
FIG. 7 is a flowchart illustrating the operation of a customer billing system based on commercial value business model in accordance with an exemplar embodiment of the present invention.

FIG. 7 is a flowchart illustrating the operation of a customer billing system based on commercial value business model in accordance with an exemplar embodiment of the present invention. Operation begins and the billing system receives usage information (block 702). The usage information may include, for example, program viewing data, such as minutes viewed, particular program blocks viewed, and the like. The usage information may also include commercial/advertisement viewing data. The commercial/advertisement viewing data may simply include a number of points earned by watching commercials. Alternatively, the commercial/advertisement viewing data may identify the commercials viewed for anonymous market research, direct marketing to potential customers, or for personalizing the television service to customers.

Next, the billing system determines a billable amount for programming (block 704). The billable amount may include, for example, a base charge for the programming package to which the customer subscribes, added fees and taxes, and extra programming and equipment charges. Then, the billing system adjusts the billable amount based on advertisement points earned (block 706). As an example, a customer may receive a specific dollar amount off a monthly bill for each point earned, such as a dollar a point. Alternatively, a customer may receive certain services for free if a predetermined number of points is accumulated. As a more specific example, a customer may receive a free upgrade including all movie channels if the customer accumulates a predetermined number of points. Thereafter, operation ends.

Thus, the present invention solves the disadvantages of the prior art by providing a mechanism for making commercials or advertisements available and searchable outside the media stream. A viewer may target a particular commercial or category of products or services for viewing. The mechanism of the present invention makes the informational content of commercials more valuable. Furthermore, value may be associated with commercials that may be exchanged for products or services. Therefore, the value of commercials extends beyond the streaming nature of the media.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of computer readable media include recordable-type media, such as a floppy disk, a hard disk drive, a RAM, and CD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, while the examples disclosed herein describe television media, the exemplary aspects of the present invention may also apply to other forms of media, such as, for example, satellite radio or streaming Internet media. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, operable on a server, for providing access to advertising within a media stream, the method comprising:
   identifying descriptors to be embedded into at least one media stream and to be used for indexing a commercial among a plurality of commercials;
   creating an index of the descriptors;
   embedding the descriptors into at least one media stream to identify the commercial for indexing among a plurality of commercials and searching the index of the plurality of commercials, the descriptors being embedded within a blanking interval between a program and the commercial;
   receiving, at the server, a request for a commercial from a first user, the request including a keyword query;
   searching at least one stored media stream for commercials matching the request;
   presenting at least one commercial matching the request to the first user;
   responsive to selection of one commercial within the at least one commercial, delivering the selected commercial to a user;
   recording points earned by the first user for viewing the delivered commercial, wherein the delivered commercial is assigned points;
   receiving an assignment of points from the first user for at least a second user; and
   assigning the points to the second user.

2. The method according to claim 1, wherein the descriptors are a part of program guide data and allow indexing of the at least one commercial using the descriptors.

3. The method according to claim 1, further comprising determining, by the server, a point cost for a selected television program.

4. The method according to claim 3, further comprising providing, by the server, access to the selected television program if the account balance is greater than the point cost.

5. The method according to claim 1, further comprising identifying, by the television device, a point value for the selected commercial responsive to playing the selected commercial to the first user.

6. The method according to claim 5, further comprising adding, by the television device, the point value to the account balance of the first user.

7. The method according to claim 5, further comprising providing, by the television device, access to television content based on the point value.

8. The method according to claim 1, wherein responsive to a period of time expiring without the first user accessing content, adding a predetermined point value to an account balance of the user for each period of time expiring, the point value being based on an identification of the first user.

9. A system for providing access to advertising within a media stream, the system comprising:
a server configured for:
identifying descriptors to be embedded into at least one media stream and to be used for indexing a commercial among a plurality of commercials;
creating an index of the descriptors;
embedding the descriptors into at least one media stream to identify the commercial for indexing among the plurality of commercials and searching the index of the plurality of commercials;
at least one stored media stream searchable for commercials matching a request, the at least one stored media stream including a recorded television stream including at least one commercial, the request comprising a keyword query; and
at least one of a server and a television device for presenting at least one commercial matching the request, the at least one of a server and a television device configured to play a selected television commercial to a user and identify a point value for the at least one commercial, the point value being based on identification credentials associated with the user, the at least one of the server and the television device providing access to television content based on the point value, wherein the user assigns points to at least one other user.

10. The system according to claim 9, wherein the at least one of the server and the television device comprises:
a component for identifying an account balance for the user;
a component for adding the point value to the account balance;
a component for determining a point cost for a selected television program;
a component for providing access to the selected television program if the account balance is greater than the point cost; and
a component, responsive to a period of time expiring without the user accessing television content, for adding a predetermined point value to the account balance for each period of time expiring.

11. The system according to claim 9, wherein the at least one commercial has descriptors associated therewith, the descriptors being part of program guide data embedded within the blanking interval, the at least one commercial being entered in an index using the descriptors, a predetermined point value being assigned to each commercial, access to media content being based on a point value assigned to the media content.

12. A computer usable storage medium device having computer usable program code embodied therein to allow access to advertising, the computer usable storage medium device comprising:
computer usable program code configured to identify descriptors to be embedded into at least one media stream and to be used for indexing a commercial among a plurality of commercials;
computer usable program code configured to create an index of the descriptors;
computer usable program code configured to embed the descriptors into at least one media stream to identify the commercial for indexing among the plurality of commercials and searching the index of the plurality of commercials, the descriptors being embedded within a blanking interval between a program and the commercial;
computer usable program code configured to receive a request from a first user for a commercial viewable on one of a television, a computing device and a communications device;
computer usable program code configured to search for any commercial corresponding to the request;
computer usable program code configured to present any commercial corresponding to the request to the first user; and
computer usable program code configured to record points earned for viewing any commercial with assigned points
computer usable program code configured to receive assignments of points from the first user for at least a second user; and
computer usable program code configured to assign the points to the second user.

13. The computer usable storage medium device according to claim 12, further comprising computer usable program code configured to search for any commercial corresponding to the request using an index.

14. The computer usable storage medium device according to claim 12, further comprising computer usable program code configured to search for any commercials indexed using a descriptor in program guide data.

15. The computer usable storage medium device according to claim 12, further comprising computer usable program code configured to determine a value associated with any commercials that may be used to exchange for media content.

16. The computer usable storage medium device according to claim 12, further comprising computer usable program code configured to exchange earned points for one of viewing media content, goods and services.

* * * * *